3,319,344
FREEZE DRYING LIQUID FOODS
George F. Sachsel, Worthington, and William H. Mink, Columbus, Ohio, assignors, by mesne assignments, to The Battelle Development Corporation, Columbus, Ohio, a corporation of Delaware
Filed Oct. 22, 1965, Ser. No. 501,718
9 Claims. (Cl. 34—5)

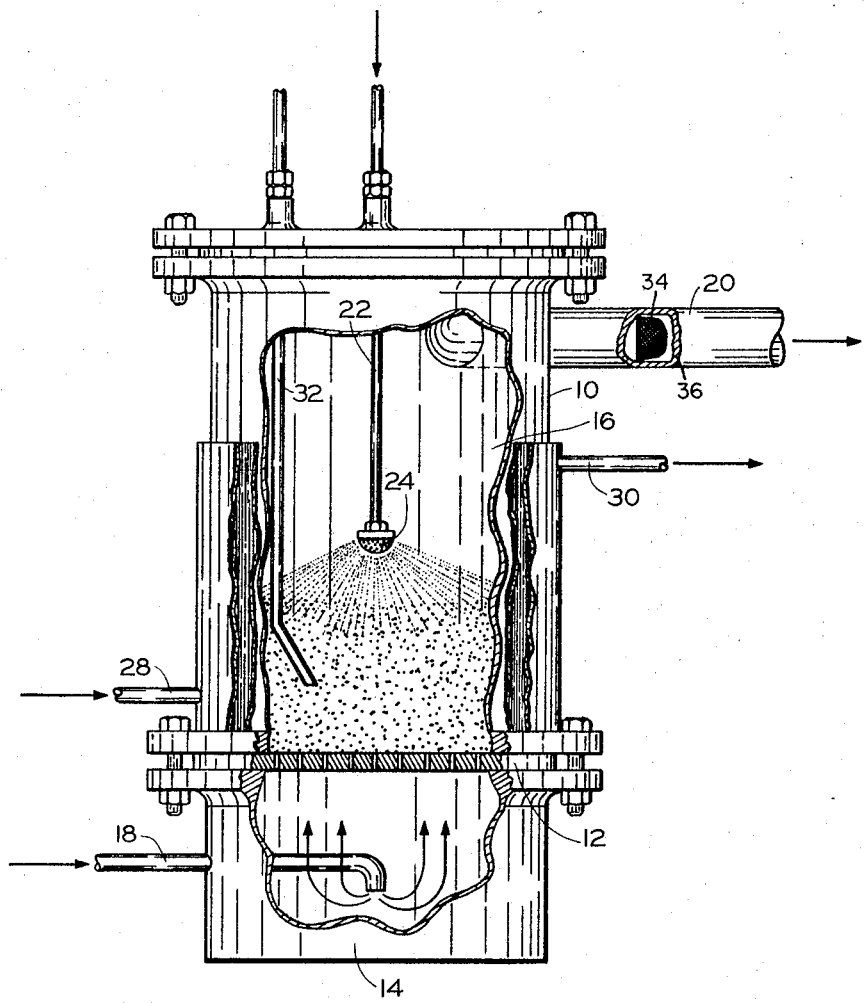

This invention relates to improvements in the manufacture of dried food products and relates in particular to a new and novel way for freeze-drying liquid foods.

In the freeze-drying of food, produce is conventionally frozen and subjected to conditions of vapor pressure and temperature which cause the frozen moisture content of the food to sublime. The resulting dry food may be packaged and stored for long periods of time without refrigeration. Prior to use, water is added to replace that removed by the process of sublimation. The reconstituted product approaches the appearance and taste of the original food much closer than other conventionally preserved foods.

Conventional freeze-drying procedures require excessive time to effect the desired product. Sublimation takes place slowly since the food product has a limited surface area from which vapors may escape. Temperatures must not be too high or the dried outer surface of the food will scorch while the frozen core still contains frozen moisture. Attempts to speed up the sublimation process by increasing the temperature frequently result in the surface of the food being burned.

A large frozen mass requires excessive amounts of time to freeze dry since sublimation progresses from the surface inwardly. Consequently, commercial methods for freeze-drying of foods generally involve placing shallow layers of divided frozen foods on trays which are then inserted in vacuum ovens where they are kept for extended periods of time. Such procedures detract from the commercial attractiveness of the freeze-drying process.

In copending patent applications Ser. No. 187,949, filed Apr. 16, 1962, now Patent No. 3,239,942, entitled, "Process for Drying Food," and Ser. No. 196,525, filed May 21, 1962, now Patent No. 3,269,025, entitled, "Freeze Drying," there is described new and novel methods for freeze drying foods. These methods involve fluidizing frozen particles of food in a vessel with gaseous currents. The total gaseous pressure within the vessel is maintained at a value equivalent to 4 mm. of mercury or less so that the fluidized frozen particles of food sublime. Since heat transfer is far more efficient in a fluidized bed of particles than in stationary trays such as are employed by the prior-known processes, sublimation takes place rapidly and the particles of food dry quickly.

In the utilization of the fluidized-bed principle of freeze-drying, many foods which are naturally of substantially small dimensions, such as berries and beans, are frozen and fluidized in substantially their natural state. Foods that are too large for fluidizing, such as beets and potatoes, are generally diced before being frozen and fluidized. Where the food is a liquid, such as orange juice or coffee, it is conventionally either frozen and crushed into a particle size suitable for fluidizing or it is frozen in small units which may be fluidized.

We have now discovered a method whereby such liquid foods may be frozen, fluidized, and sublimed substantially simultaneously without the necessity of first freezing the liquid and then crushing the frozen liquid into fluidizable particles or of freezing the liquid in the form of fluidizable particles. Our new method and apparatus not only eliminates the necessity of the extra step of providing frozen liquids in particulate form but also provides the frozen liquid in a particularly desirable small particulate form which sublimes much faster and completely than has heretofore been envisioned.

We have discovered that liquid foods may be sprayed into a vessel having a low gaseous pressure therein and a counter current gaseous flow to effect freezing, fluidization and sublimation of the sprayed liquid.

Accordingly, it is the object of the present invention to provide a method and apparatus whereby liquid foods may be freeze dried without the necessity of prefreezing and crushing said foods or freezing such foods in a form susceptible to fluidization.

Another object of the present invention is to provide a method and apparatus whereby liquid foods may be sprayed into a fluidized bed of inert particles under such low pressure conditions that such food will coat such particles, freeze and sublime.

It is also an object of the present invention to provide a method and apparatus whereby liquid foods may be converted into fine, frozen particles and fluidized under freeze-drying conditions at substantially the same time.

A further object of the present invention is to provide a method and apparatus whereby liquid foods are sprayed into a vessel, said vessel being provided with a low pressure disposed to cause the spray to freeze and sublime and said vessel being further provided with a gaseous counter current disposed to fluidize said frozen spray as sublimation takes place.

The single figure of the drawing is an illustrative cross-sectional view of a fluidizing vessel-spray apparatus that falls within the scope of the present invention.

In the apparatus of the drawing a vessel 10 is provided with a fluidizing distributor plate 12 positioned between a fluidizing gas plenum chamber 14 and a main fluidized bed chamber 16. Distributor plate 12 is a perforated plate of conventional design disposed to divide the fluidizing gases entering chamber 14 from gas inlet 18 into multiple dispersed jets which flow upwardly into the main chamber 16 and effect proper fluidization of particles within the vessel. Chamber 16 of vessel 10 is provided with an outlet 20 that leads to a vacuum source such as a vacuum pump of conventional design (not shown).

A conduit 22 projects into chamber 16 of vessel 10 through an opening in the top of the vessel and terminates within chamber 16 into a spray nozzle 24.

The apparatus of the drawing is provided with optional equipment designed to enhance its operation. Such optional equipment consists of a water jacket 26 positioned around chamber 16 of vessel 10. Jacket 26 is formed with a liquid coolant inlet 28 and outlet 30. Such a jacket enables the operator of the device to more closely control the temperature within chamber 16.

Another optional adjunct consists of a pressure probe conduit 32 which extends into vessel 10 and enables one to insert a pressure probe into chamber 16 and adjust the input of fluidizing gas and the vacuum pumps (not shown) to maintain the desired degree of fluidization and pressure within chamber 16.

One method of carrying out the process of the present invention is to provide a bed of inert particles within chamber 16 of vessel 10. Such inert particles should be of a size that is readily fluidized preferably being within the usual fluidized-bed particle range of from about −8 to +325 mesh. A vacuum is drawn within chamber 16 by the vacuum pumps disposed to withdraw the atmosphere from within chamber 16 through the exhaust outlet 20. Fluidizing gas is introduced into the plenum chamber 14 through inlet 18 in sufficient volume to cause jets of gas to flow upwardly into chamber 16 through the perforations of distributor plate 12 and fluidize the inert particles. A pressure probe (not shown) of convenient construction inserted into chamber 16 through conduit 32 enables the operator to accurately ascertain the pressure within the chamber. He may then proceed to adjust the degree of vacuum pump activity andt he amount of fluidizing gases introduced into plenum chamber 14 via inlet 18 to effect fluidization while maintaining the desired pressure within the chamber 16. Such adjustments are well within the skill of the art.

It will be understood that the desired pressure level within chamber 16 is not atmospheric pressure but instead is a pressure at which a solid ice phase can exist in equilibrium with the vapor phase. When pure water is being considered, this pressure is equivalent to about 4 mm. of mercury. The practice of reducing the total gaseous pressure within chamber 16 is a practical and preferred means for providing an environment such that the partial pressure of the water vapor will not exceed the desired value. Another potential mode of operation is to introduce a dried (low water vapor content) gas through inlet 18. A third means of providing conditions which will permit the desired partial pressure of water vapor is to combine a relatively low-vapor content fluidizing gas with a lowered atmospheric pressure. Where an evacuated system, such as vessel 10, is employed, wherein the total chamber pressure is reduced to 4 mm. of Hg, even if the atmosphere is 100 percent water vapor, the partial pressure will not exceed 4 mm. of Hg and ice crystals will sublime.

The preferred and practical mode of operation is to create a vacuum (vio outlet 20) within chamber 16 and leak fluidizing gas into the vessel through inlet 18 by means of an appropriate valve (not shown). The leaked-in gas is regulated to provide fluidization within chamber 16. A sufficient vacuum is retained within chamber 16 to maintain a vapor pressure equivalent to 4 mm. of mercury or less.

In the operation of the apparatus of the drawing, liquid food such as orange juice, coffee, tea etc. is introduced into chamber 16 through conduit 22 and spray nozzle 24. Spray nozzle 24 is preferably one that is disposed to provide a fine spray onto the fluidized bed of inert particles. Such spray should be directed downwardly and outwardly, however, care should be taken that droplets do not impinge on the sidewalls of vessel 10 prematurely or prior to their solidification. In accordance with the process of the present invention, since the vapor pressure within chamber 16 of vessel 10 is at or below the equivalent of 4 mm. of mercury the water-base liquid spray droplets will either solidify or vaporize as they enter chamber 16. Where a fluidized bed of inert particles is employed within chamber 16, as shown by the single figure of the drawing, the liquid spray will coat the individual particles with frozen liquid food which immediately begins to freeze-dry. Where inert particles are not employed within chamber 16, the spray and fluidizing gases may be regulated so that the spray droplets freeze to form a sleet-like fluidized bed. The frozen moisture of individual particles immediately begin to sublime.

The spray from nozzle 24 is preferably very fine and as stated above should not cause the liquid to impinge on the side of vessel 10 prior to freezing. The spray itself will, of course, tend to change the total pressure and the pressure of water vapor within chamber 16 so that compensating vacuum and fluidized gas flow adjustments may be required.

The freeze-dried product which coats inert particles may be recovered from the fluidized bed by removing the particles from the bed and agitating to abrasively separate the freeze-dried product from the inert particles. We have found that such particles generally abrade one another while in the fluidized state to remove the freeze-dried coating while within the bed of vessel 10. Such freeze-dried organic materials are of light weight and fine size and consequently flow from vessel 10 through outlet 20. To collect and recover said fines we have found it to be expedient to position an appropriate filter (shown in the breakaway portion 36 of outlet 20 at 34) within the conduit leading from outlet 20 to the vacuum pumps.

By regulation of total pressure, spray velocity and fluidization gas velocity, freeze spraying and sublimation may be effected irrespective of temperature. It is desirable to elevate the temperature within chamber 16 to facilitate sublimation or vaporization of the ice crystals, however, if too high a temperature is employed the sublimed food may burn or scorch. Consequently, it is preferred to maintain the temperature within chamber 16 somewhere between the freezing point and the boiling point of the liquid food. Though these foods are composed largely of water their freezing and boiling temperatures are lower and higher, respectively, than water. It is unlikely that it would be desirable to employ a temperature as high as the boiling point of water (212° F.) however it may be desirable to employ a temperature as low as −50° F. For example, the freezing temperature of orange juice is about −41° F.

As in set forth in copending patent applications Ser. No. 196,525 and 187,949 the liquid-solid phase diagram of water shows that at a vapor pressure of not greater than 4 mm. of mercury, ice will sublime to vapor. Under such conditions aqueous liquid spray will also freeze so that under these conditions aqueous liquid foods sprayed into chamber 16 freeze and sublime. However, many liquid foods such as coffee and orange juice contain constituents other than water that are combined with the water to alter its phase diagram characteristics. Eutectic compositions are formed wherein a a given temperature and concentration the material changes to the liquid state even though the vapor pressure within the chamber is at or below the equivalent of 4 mm. of mercury. Under these circumstances the temperature and/or total pressure must be lowered to avoid tackiness in the freeze-dried product. For example, as pointed out in application Ser. No. 196,525 it is preferable to employ temperatures below −25° C. When freeze drying orange juice to avoid a eutectic that is reached at higher temperatures. Thus, when employing the method and apparatus of the present invention to obtain a freeze-dried product, it is sometimes preferable to regulate the temperature and/or vapor pressure in a manner to avoid a low melting eutectic composition.

Since liquid foods are water base, their freezing and boiling temperatures will be lower and greater, respectively, than the freezing and boiling temperatures of pure water. Although it is unlikely one would choose to utilize the method of the present invention at temperatures greater than the (atmospheric pressure) boiling point of water (212° F.), for some liquid foods it may be desirable to employ temperatures as low as −50° F.

The other parameters set forth in copending patent applications Ser. Nos. 196,525 and 187,949 are equally applicable to the process of the present invention since the principles of sublimation of fluidized particles are the same. For example, the heat of sublimation may be supplied to chamber 16 by means other than jacket 16. Such heat, if required may be provided by heating the fluidizing gases, the inert particles (if used), or by radiant heat, dielectric heating, induction heating etc. The residual moisture of the sublimed product should not be greater than about 7 percent by weight and preferably will be about 2 percent or lower. The gas employed to fluidize the bed may be any gas which does not render the sublimed food unfit for human consumption and may be air, nitrogen, carbon dioxide etc. Where an inert particulate substance is employed as a fluid bed onto which a frozen spray coating is deposited such substance may be any material that does not render the sublimed food unfit for human consumption.

Although, as pointed out above, the desirable conditions can be obtained by means other than reducing the total pressure within chamber 16 of vessel 10 it will be understood that such vacuum means is presently the most practical and is therefore preferred. It may, however, be expedient to use a dry fluidizing gas in addition to low total pressure to maintain a partial pressure of water vapor of 4 mm. of mercury or less.

To illustrate the utility of the present method and apparatus, drinking strength percolated coffee was sprayed into a fluidized bed of granulated tricalcium phosphate and corn cob grit (about 10 mesh) in an apparatus such as that depicted by the drawing. The coffee was first boiled for 15 minutes to remove dissolved air and then allowed to cool. The atmospheric pressure within the fluidization chamber was maintained at about 1.00 mm. of mercury so that the vapor pressure within the chamber was considerably less than the equivalent 4 mm. of mercury. The nozzle used was a number 1650 (see Spraying Systems Company Catalogue 25, p. 47) and the liquid flow rate was approximately ⅛ liter per hour. Air was leaked into the plenum chamber as the fluidizing gas at a superficial space velocity rate of about 15 lbs./hr./ft.$^2$ which provided a bed depth of approximately 3 inches. The coffee was sprayed into the bed intermittently. To avoid freezing of the liquid flow in the nozzle, the nozzle was cleared out by flushing with air after each spurt of liquid. At the conclusion of spraying, the bed particles were examined microscopically and were found to have a coffee stain on their surfaces but no deposit of coffee remained on the particles. A filter placed in the vacuum pump outlet of the vessel was found to be full of freeze-dried coffee powder.

What is claimed is:
1. A method for freeze-drying liquid foods comprising:
 (a) spraying said liquid foods into a fluidized bed contained in a vessel;
 (b) maintaining a pressure of water vapor within said vessel of not more than about 4 mm. of mercury so as to freeze said spray;
 (c) maintaining a temperature within said vessel disposed to effect sublimation of said frozen liquid without burning the organic content of said liquid; and
 (d) removing the dry organic material from said vessel.
2. A method for freeze-drying liquid foods comprising:
 (a) spraying said liquid foods into a vessel;
 (b) maintaining a partial pressure of water vapor within said vessel of not more than about 4 mm. of mercury so as to freeze the spray droplets;
 (c) maintaining a gaseous current within said vessel substantially opposing said spray so as to fluidize said frozen spray droplets;
 (d) maintaining a temperature within said vessel disposed to effect sublimation of said frozen spray droplets without burning the organic content of said liquid; and
 (e) removing the dried organic material from said vessel.
3. A method for freeze-drying liquid foods comprising:
 (a) spraying said liquid foods into a fluidized bed of inert particles within a vessel so as to coat said particles with said liquids;
 (b) maintaining a vapor pressure within said vessel of not more than about 4 mm. of mercury so as to freeze said liquid particle coatings;
 (c) maintaining a temperature within said vessel disposed to effect sublimation of said frozen liquid coating without burning the organic content of said liquid; and
 (d) removing the dried organic material from said vessel.
4. The method of claim 1 wherein the temperature within said vessel is maintained below the eutectic temperature of the liquid of said liquid food.
5. The method of claim 3 wherein said temperature within said vessel is in the range of from about −50° F. to 212° F.
6. The method of claim 3 wherein said dried organic material is filtered from the exhaust gases of said fluidized bed.
7. The method of claim 3 wherein said inert particles are removed from said bed and said dried organic materials are removed from the surface of said particles.
8. The method set forth by claim 3 wherein said pressure is at least partially maintained at 4 mm. of mercury or less by maintaining a partial vacuum within said fluidized bed.
9. An apparatus for freeze-drying liquid foods comprising:
 (a) a fluid-bed vessel having a plenum chamber, a fluidizing chamber, and gas distributor means therebetween;
 (b) means for withdrawing atmosphere from said fluidizing chamber;
 (c) means for introducing fluidizing gases into said plenum area so that said gas distributor means is disposed to fluidized particles within said fluidizing chamber;
 (d) means for spraying a liquid into said chamber so that when pressure therein is equivalent to 4 mm. of mercury or less said sprayed liquid will freeze and sublime; and
 (e) means for removing the residue from said sublimed liquid.

References Cited by the Examiner
UNITED STATES PATENTS

| | | | |
|---|---|---|---|
| 2,400,748 | 5/1946 | Flosdorf | 34—5 |
| 2,471,035 | 5/1949 | Hurd | 34—92 |
| 2,635,684 | 4/1953 | Joscelyne | 34—10 |
| 2,841,476 | 7/1958 | Dalton | 34—57 |
| 3,233,333 | 2/1966 | Oppenheimer | 34—92 |

WILLIAM J. WYE, *Primary Examiner.*